March 26, 1968     W. W. SCHROEDER ET AL     3,374,536
INCAPSULATION OF ELECTRICAL UNITS
Filed Oct. 29, 1964     2 Sheets-Sheet 1
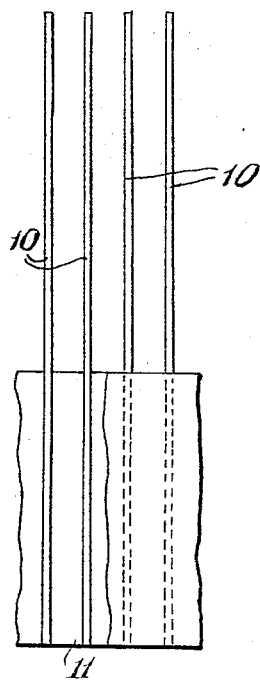
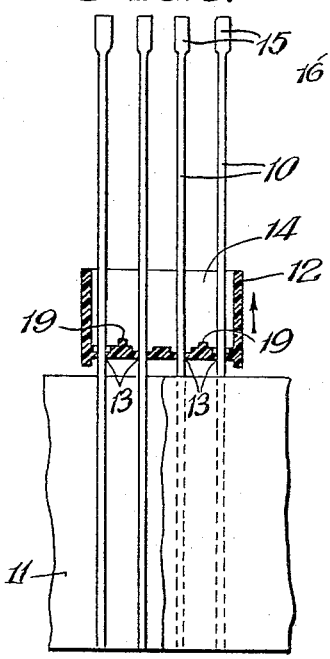
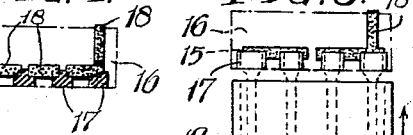
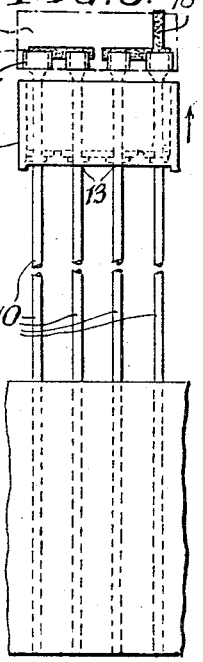
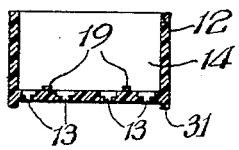
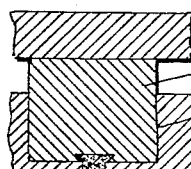
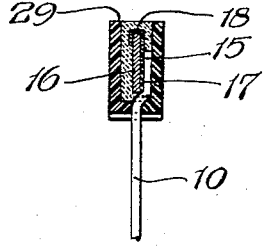
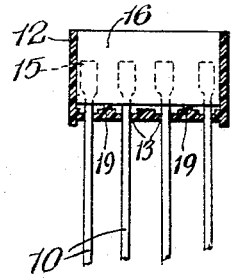
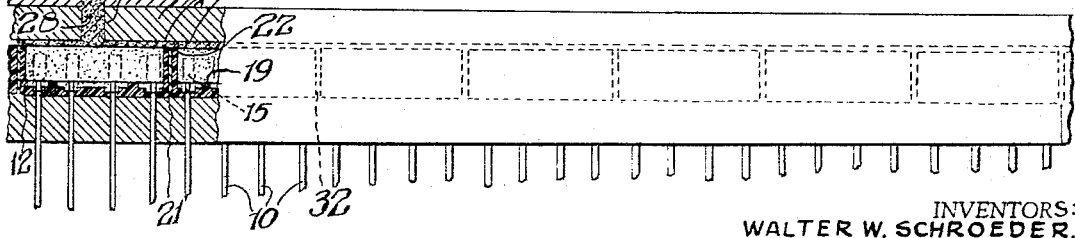
INVENTORS:
WALTER W. SCHROEDER,
JOHN H. FABRICIUS,
ALPHONSE E. WILL
BY Connolly and Hutz
ATTORNEYS March 26, 1968 W. W. SCHROEDER ET AL 3,374,536
INCAPSULATION OF ELECTRICAL UNITS
Filed Oct. 29, 1964 2 Sheets-Sheet 2
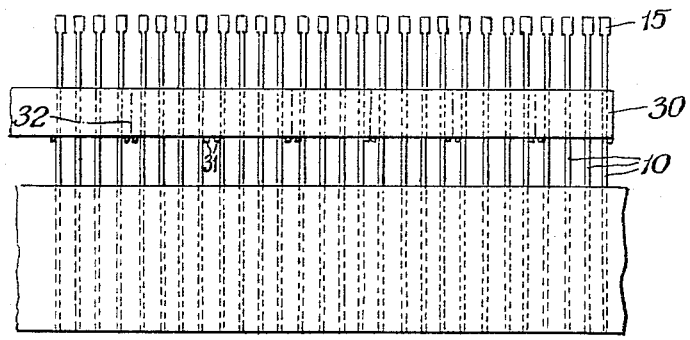
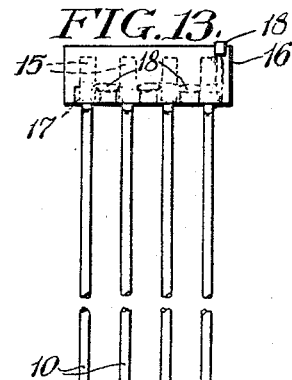
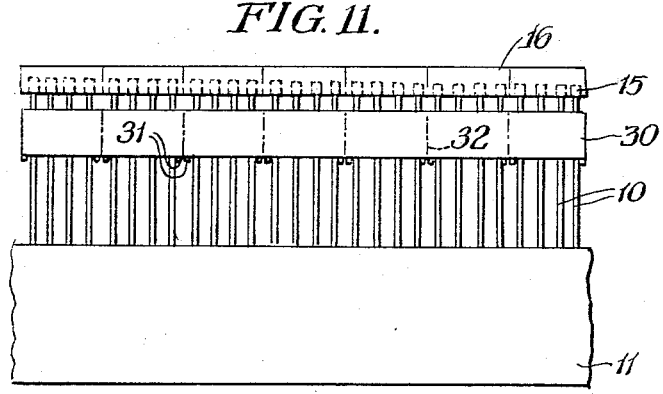
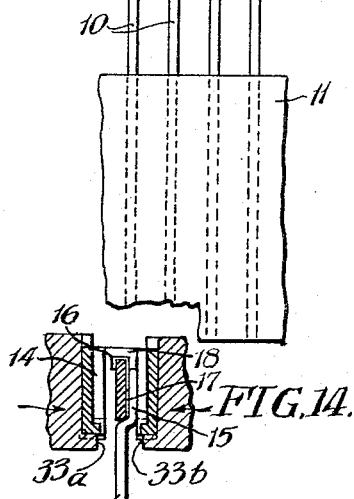
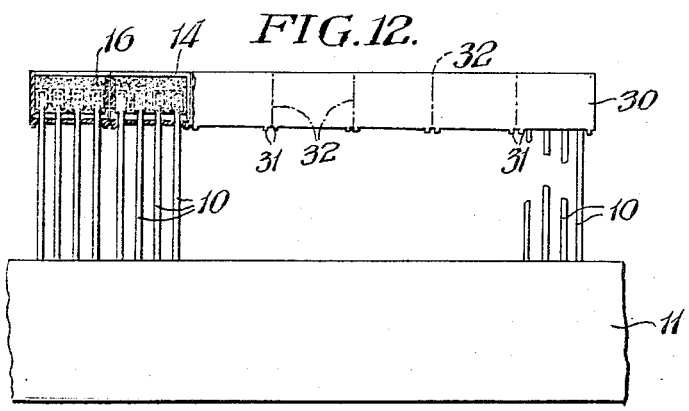
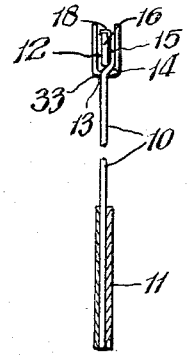
INVENTORS:
WALTER W. SCHROEDER,
JOHN H. FABRICIUS
ALPHONSE E. WILL
BY *Connolly and Hutz*
ATTORNEYS United States Patent Office 3,374,536
Patented Mar. 26, 1968

3,374,536
INCAPSULATION OF ELECTRICAL UNITS
Walter W. Schroeder, Williamstown, Mass., John H. Fabricius, Stamford, Vt., and Alphonse E. Will, Adams, Mass., assignors to Sprague Electric Company, Adams, Mass., a corporation of Massachusetts
Filed Oct. 29, 1964, Ser. No. 407,490
8 Claims. (Cl. 29—613)

ABSTRACT OF THE DISCLOSURE

An electrical unit is encased in a moldable material by mounting wire terminals in a spaced relation on a support and preformed resin shells are carried on the wire terminals in such a manner that successively electrical units can be constructed on the ends of the terminals and the shells then move around the units.

This invention relates to a method and means for hermetically incasing miniature electrical units, and more particularly to the incapsulation of delicate and sensitive miniature electrical circuit units.

The incasement of electrical units in a resin material is one way of packaging a number of electrical elements in a single continuous body. One particularly feasible technique is to provide a substrate on which are connected the various electric elements. In the interest of obtaining a number of devices in a small volume the elements and the substrate may be composed of tiny, delicate and sensitive materials which require protection.

A method of providing this protection is incapsulation in a resin. Incapsulation is a term in the electrical art that refers to the incasement of electrical elements in a seamless body. It is important that the incapsulated unit be covered with an adequate layer of resin that protects the active parts from moisture and physical and thermal shock. The resin must be sealed around the incapsulated unit so as to eliminate and exclude air and to hold the parts firmly in place. The incasing resin must also provide electrical insulation. At the same time it is important that the overall dimensions of the ultimate product be held to a minimum so as to maximize the packaging density.

The devices of the particular subject of this development are of minimum size which makes them sensitive to slight dimensional differences. Therefore it is important that the positioning of the component in the incapsulation material be accurate and that the accuracy be easily reproducible and adaptable to large scale production. Further the minimizing of the overall size of the ultimate product makes it desirable to keep the walls of the resin incasement thin and yet assure complete coverage of the electrical unit. Thus it is of importance to be able to carry on an incapsulating procedure within close dimensional tolerances and still place incapsulating material all around the electrical unit.

Further it is valuable for the incapsulating resin to be isotropic in relation to the unit which it incases. Previously incapsulated units have been incased in a covering made up of an outer shell filled with a resin material which has a different nature than the shell. The differences between the shell and the sealing material prevents the incapsulating material in final form from being isotropic.

It is an object of this invention to incapsulate electrical circuit elements on a substrate in a resin by a transfer molding operation to provide an isotropic resin cover.

Another object of this invention is to incapsulate a number of substrates in a common isotropic resin cover by a single operation.

Still another object of this invention is a molded unit containing a plurality of active structural elements each carrying a number of electrical elements in a single integrated thermoset resin composition susceptible to ready separation of fully incapsulated units one from another.

An additional object of this invention is a method for the central positioning of a small electrical circuit unit in a thin covering of incapsulant by a high separation repetitious process of such reproducibility that the resulting units are admirably suited for utilization by automatic insertion equipment.

The objects of this invention include a method for minimizing the overall dimensions of an incapsulated electrical circuit unit on a substrate and minimizing opportunity for mold damage in producing an incapsulated device by transfer molding around an electrical circuit unit assembly in a premolded shell.

These and other objects of this invention will become more apparent upon consideration of the following description taken together with the accompanying drawings in which:

FIGURE 1 is a front elevation of a group of wire terminals mounted on a tape;

FIGURE 2 is a longitudinal section of a resin shell according to this invention;

FIGURE 3 is a front elevation of the mounted wire terminals of FIGURE 1 carrying the resin shell of FIGURE 2;

FIGURE 4 is a front elevation of a substrate carrying electrical elements according to this invention;

FIGURE 5 is a side elevation of an assembly of the members depicted in FIGURES 3 and 4;

FIGURE 6 is a front elevation of the assembly of FIGURE 5;

FIGURE 7 is a front elevation of the upper end of the assembly of FIGURE 6 with the resin shell positioned around the substrate;

FIGURE 8 is a sectional view of a transfer molding apparatus for use in this invention;

FIGURE 9 is a cross section of the molded unit of this invention;

FIGURE 10 is a front elevation of groups of wire terminals and a channel resin shell mounted on a tape according to a modification of this invention;

FIGURE 11 is a front elevation of the assembly of FIGURE 10 having the individual substrates mounted thereon;

FIGURE 12 is a front elevation of the assembly of FIGURE 11 with the channel resin shell positioned around the substrates;

FIGURE 13 is a front elevation of a group of wire terminals and a substrate mounted on a tape according to another modification of this invention;

FIGURE 14 is a cross section of a split shell for the modification of FIGURE 13 supported in movable mold jaws; and, FIGURE 15 is a side elevation partially in cross section showing the shell of FIGURE 14 in enclosed position around the substrate.

Referring to the drawings, FIGURE 1 shows lead-wires 10 mounted on a tape 11 which is preferably continuous and coated on one side with a suitable adhesive substance, such as a thermoplastic adhesive. The terminals 10 are applied to the tape 11 by being pressed into the adhesive. The continuous tape 11 received groups of the lead-wires 10 for passage through the various manufacturing steps by which an incapsulated circuit unit is constructed on each group of lead-wires.

The front sectional view of a case 12 in FIGURE 2 shows an interior chamber 14 of the case and passages 13 through the lower wall or bottom of the case. A countersunk or enlarged portion is shown in each of the passages 13. Small ribs 19 formed on the inside of the bottom wall of the premolded case 12 extend upward into the chamber 14. The upstanding ribs 19 are preferably positioned between adjacent passages 13. The significance and function of the ribs 19 are described in detail below.

FIGURE 3 shows a premolded case 12 mounted on four lead-wires 10 which extend snugly through the passages 13 at the bottom of case 12. After the case 12 is passed on the wires 10, the ends of wires 10 are deformed by swaging and bending. The swaged and bent ends 15 of the wires 10 conform to and receive the substrate carrying circuit elements described in greater detail below.

According to this invention, substrates 16 carrying electrical elements 18 are mounted on the ends of the respective groups of lead-wires. The electrical elements are constructed on and in the substrate 16 which may be any suitable support, such as a ceramic wafer or chip.

As illustrated in FIGURE 4, the substrate 16 carries spaced terminals 17, each adapted to receive an individual lead-wire 10. The arrangement of these parts is such as to permit the positioning on the substrate 16 of electronic elements 18 and connected electrical parts and even thereby providing integrated circuitry on the continuous lead-wires 10 with respect to each other and with respect to the substrate 16 by suitable techniques. The substrate 16 and its elements 18 are then brought to the tape 11 and the grouped wires 10.

The alignment of the assembly of substrate 16 and lead-wires 10 with respect to each other and with respect to case 12 is illustrated by the sectional view of FIGURE 5. The crimped and swaged ends 15 of lead-wires 10 leave them flattened and shaped to receive substrate 16 in an alignment which fits the combined parts within the chamber 14 of case 12. As indicated in FIGURE 5, the substrate 16 mounted above the bend in the end 15 can be received within chamber 14 when case 12 is lifted around the substrate. The location of the body 16 and the offset of the crimped ends 15 of lead-wires 10 provide a centralized location of this assembly in the incapsulant. The completion of this incapsulation in a centralized location is described in greater detail below.

FIGURE 6 is a front view of the assembly of FIGURE 5 showing the substrate 16 attached to the ends 15 of a group of lead-wires 10. As indicated by the arrow at the side of case 12, the case 12 is independently mounted on lead-wires 10 so that it may be slid along the wires in an upward direction as seen in FIGURE 7. Prior to positioning around the substrate 16, the case 12 is carried on the lower portion of the wires 10, as illustrated in FIGURES 5 and 6.

FIGURE 7 is a front elevation of the upper ends 15 of a group of lead-wires 10 with the substrate 16 attached thereto and with case 12 lifted into the enclosing position so that the substrate 16 lies entirely within the chamber 14 of case 12 and abuts against the ribs 19 on the bottom of the case. Thus the body 16 is positioned in the chamber 14, but raised out of extensive contact with its bottom surface. The case 12 extends slightly above the upper edge of substrate 16 so that the substrate 16 lies within the open side of chamber 14.

According to this invention, incapsulating of the component is completed by transfer molding a resin into the premolded case 12 with the case 12 acting as a shell to receive the fluidized resin. In the prior art, resin has been cast into a phenolic shell and cured to a solid, which with the outer phenolic shell incapsulates the component. In this invention the transfer molding operation provides an incapsulant in which all of the parts are of the same physical properties and nature, and have these same properties in all directions.

In the transfer molding operation of this invention, the centralized location of the substrate 16 in the isotropic incapsulant is accurately reproducible in a high speed repetitive operation. A number of substrates 16 are inserted into their respective cases 12 of identical configuration and arranged in a transfer molding apparatus, which by a transfer molding technique makes the resin fluid under heat and pressure and molds the fluidized resin into the case 12.

The outer premolded shell, which is referred to as case 12, serves as a mold for the transfer molded thermosetting resin insulating material which is flowed into the case 12 and becomes integrated with the case as the fluid material cures to a solid resin material. This integration which leads to a uniformity of the incapsulating material is a product of the transfer molding operation and is peculiar to the transfer molding operation. The thermosetting resin is cured under heat and pressure after being flowed into the premolded case 12. The curing which takes place during the transfer molding operation completes the condensation of the material of the case 12 at the same time that the fill is being cured. As a result, the simultaneous curing brings about a uniformity of the two resins which in turn results in an isotropic incapsulant.

The premolded case 12 is composed of a resin which forms a solid by progressive condensation or polymerization. Phenol formaldehyde is referred to in the preferred embodiment described elsewhere in greater detail. Melamine formaldehyde is an example of another resin. Alkyd molding resins such as linear polyesters containing ethylenic unsaturation which form the basis for alkyd resin moldings are suitable for the case. Diallylphthalate is one such linear polyester which polymerizes. Basically, the molding compound condenses or polymerizes into the hard rigid shape of the premolded case 12.

The transfer molding involves placing the transfer molded resin in solid form in a heated chamber for a short time, whence it is forced through an orifice into the mold under pressure of from about 50 p.s.i. to several thousand p.s.i. according to known molding pressures for various resins. The combined heat and pressure cause the solid to flow, and this action is referred to herein as fluidization. The mold in turn is heated to a setting temperature at which the fluidization molded material rapidly sets.

A suitable transfer molding material is epoxy resin, which is made by condensing epichlorohydrin with bisphenol A (diphenylol propane). The epoxy resins are cured by many types of material through coupling or condensation reactions. The transfer molding material may also be phenolic molding compounds in particle form which fluidize under heat and pressure and condense to a solid under heat and pressure in the mold.

The transfer molding of the preferred embodiment of this invention involves placing the epoxy resin material in a heated chamber where it is subjected to heat for a short time whence it is forced through an orifice into premolded phenolic case 12 under pressure of from about 50 to about 150 p.s.i. The mold in turn is heated to full setting temperature to effect rapid setting of the thermoset material.

In molding the epoxy material adequate gating and venting are important. It is important to have runners which will allow the material to enter the mold cavities in the most fluid state. An important advantage is the production of parts which have a minimum of strain and can be produced within close dimensional tolerances.

Further the units should be accurately positioned within the incapsulating resin material. In this invention the electrical unit is accurately located in the incapsulating resin by the internal configuration of the resin case 12 in which the component substrate 16 with its electrical elements 18 is interpositioned and then incapsulated. The technique of this invention provides proper location and avoids the problems which arise when incapsulation does not follow the teaching of this invention.

The process in general involves molding the phenolic cases 12; straightening and cutting lead-wires 10 to the desired length, holding lead-wires 10 at a given spacing, mounting on tape 11, and inserting in the cases 12 on a wire loom; soldering terminals 17 on substrates 16 to the grouped lead-wires 10; degreasing and inserting the substrates into the cases 12; and, transfer molding to incapsulate the substrates and produce the accurate product of this invention.

FIGURE 8 illustrates a representative transfer molding apparatus for the purpose of this description. The mold apparatus is shown partially in section to reveal two cavities 20 separated by lands 21. Land 21 forms the side of a runner 22. The runners 22 are completed by the lid 23 which is positioned over the cavity 20. The transfer molding apparatus has a heated chamber 24 in which a piston 25 reciprocates to force the fluidized material, such as epoxy resin, from a nozzle 26 through an orifice 27 into a gate 28. The gate 28 opens into the first most adjacent cavity 20 of the apparatus 19.

FIGURE 8 further illustrates cases 12 containing respective substrates 16 positioned in cavities 20 of the mold apparatus in a typical transfer molding operation. The epoxy resin flows out of the gate 28 into the first cavity 20 and through runners 22 from one successive cavity 20 to the other. The combined heat and pressure on the fluid material brings about the integration of the epoxy material and the phenolic material of the case 12 at the same time that the solidification of the epoxy material is taking place by curing.

FIGURE 9 is a cross sectional view of the finished incapsulation showing the isotropic incapsulant 29 which encloses the substrate 16 and the end 15 of the lead-wire 10.

With the devices and techniques of this invention the two stage molding operation permits the carrying of the substrate 16 through a series of sequential manufacturing steps in a substantially automatic assembling procedure for producing the integrated circuit component. It is possible to employ a continuous tape to which the elements are attached until all of the manufacturing operations in the production of the integrated circuit have been completed. In this procedure the cases are retracted into withdrawn position. After the substrates 16 are attached to the grouped wires 10 the cases 12 are moved into the molding position of FIGURE 7 where each operates as a mold.

The above described embodiment of this invention illustrates many of its advantages and contains preferable features. However, the principles of this invention are not limited to the particular construction shown and described. It will be understood that modifications of the various parts may be made while employing the basic principle.

A modification of this invention employs a premolded case in which a number of chambers are incorporated in a single premolded piece. This modification is illustrated in FIGURES 10, 11 and 12. Referring to FIGURE 10 the lead-wires 10 are shown mounted on a tape 11 in groups as described above in connection with the preferred embodiment. In this modification, however, the individual cases 12 are replaced by a multiple chamber case 30. The lead-wires 10 are mounted on the tape 11 in given spacing as shown and the case 30 is mounted on all the groups of wires 10.

FIGURE 11 illustrates seven substrates 16, each mounted on a group of lead-wires 10. In this position the substrates 16 are mounted for carriage through the manufacturing steps. The finishing procedures are carried out in this inverted procedure as described above in connection with the preferred embodiment. At the close the product mounted units are drawn in groups into the individual compartments 14 of multiple chamber case 30.

FIGURE 12 illustrates the position of the case 30 with the components drawn into the respective chambers 14 is similar to that of the locating illustrated in FIGURE 7 save that as shown in FIGURE 12 seven units mounted on an equal number of groups of wires 10 are drawn into the chambers 14 of the single piece multiple chambered case 30. The transfer molding operation is carried out with the case 30 positioned in a suitable cavity in the transfer molding apparatus. The transfer molding apparatus as illustrated in FIGURE 8 is suitable when adapted to receive the larger case 30.

This single incapsulation containing a plurality of components with their respective groups of wires extending from the encapsulation is divided into individual units by severing the incapsulant between the compartments 14 holding the incapsulated components. The case 30 is provided with external indicia 31 to mark its location for separation. As illustrated in FIGURES 10–12 a pair of protrusions 31 at each side of the various lines of severance 32 indicate the area through which the case 30 must be cut to separate the respective units while providing adequate covering to the incapsulated component. Indicia 31 extend below the case so as to serve as mounting feet for the incapsulated component.

In another modification, the premolded shell is not inserted on the lead-wires during the assembly of the substrates and lead-wires. In this modification, the premolded shell is molded in two halves 33 which mate longitudinally along the passages for the wires. The halves 33 are not joined around the units until after the substrates 16 have been soldered on the grouped wires 10. The groups of lead-wires 10 are mounted previously on the tape 11 as described above in connection with the other embodiments.

An individual unit is provided on each group of lead-wires 10 in the manner described above. The principal variation of this modification from the previously described embodiments is the absence of the premolded case from the grouped lead-wires 10 during this assembly procedure. A group of lead-wires 10 of this embodiment carrying an attached body 16 is illustrated in the front elevation of FIGURE 13.

After the groups of lead-wires 10 have received their respective substrates 16, the tape 11 carries the resultant component assemblies. FIGURE 14 shows one of the bodies 16 positioned in a chamber 14 of split case 33 made up of two halves, 33a and 33b. The two halves 33a and 33b are separated longitudinally of the body 16 and come together to form the chamber 14 around the body. The case 33 is provided with passages 13 formed in the bottom wall for each of the lead-wires 10, as shown in FIGURE 15, and the longitudinal division is along these passages. Transfer molding according to the procedures set forth above incapsulates the units and joins the halves of case 33 into an isotropic whole. The method of this invention provides a faster, less expensive and more exact technique for incapsulating electrical circuit components. Air is worked out of the incapsulation and voids are thus eliminated. The product looks better in appearance than the prior art.

Specific advantages of the various embodiments include the importance of the centering rib or ribs in placing the component in the case. Each component is centrally located in the incapsulant as the result of this centering. It is also to be noted that possible defects in the premolded case are remedied in the transfer molding operation as described. As a result the ultimate incapsulant does not contain the defect. As indicated above in the description the shell or case functions as a jig in itself.

The method of this invention set forth in the above description and its products are presented in the embodiments for the purpose of illustration. It will be understood that the principles permit modifications within the spirit of the invention. Therefore, it is intended that the scope of the invention be limited solely by the following claims.

What is claimed is:

1. The method of manufacturing an incapsulated electrical unit which comprises mounting groups of wire terminals on a continuous adhesive tape, each group being attached at predetermined longitudinal spacing from adjacent groups, placing a premolded shell of resin material on each group of terminals to form a wire loom, thereafter deforming end portions of the wire terminals, attaching a thin member carrying electrical elements and contacts to the deformed end portions of each group of terminals, subsequently in timed sequence positioning each thin member and its terminal ends in a mold cavity of the premolded shell, introducing additional resin material in fluidized form under transfer molding pressure substantially entirely into the mold cavity, heating the premolded shell and the fluidized resin material at a temperature to integrate the introduced resin material and the premolded shell into an isotropic incapsulating material, and finally removing the completed incapsulated unit from the molding and the tape.

2. The method of manufacturing an incapsulated electrical unit which comprises mounting groups of wire terminals on a continuous adhesive tape, each group being attached at predetermined longitudinal spacing from adjacent groups, placing a premolded shell of resin material on each group of terminals to form a wire loom, thereafter deforming end portions of the wire terminals, attaching a ceramic member carrying electrical elements and contacts to the deformed end portions of each group of terminals, subsequently in timed sequence positioning each ceramic member and its terminal ends in a mold cavity of the premolded shell, introducing additional resin material in fluidized form under transfer molding pressure substantially entirely into the mold cavity, heating the premolded shell and the fluidized resin material at a temperature to integrate the introduced resin material and the premolded shell into an isotropic incapsulating material and finally removing the completed incapsulated unit from the molding and the tape.

3. The method of manufacturing an incapsulated electrical unit which comprises mounting groups of wire terminals on a continuous adhesive tape, each group being attached at predetermined longitudinal spacing from adjacent groups, placing a premolded shell of resin material on each group of terminals to form a wire loom, positioning said shell on said terminals at a point removed from the terminal ends by more than the height of the shell, thereafter deforming end portions of the wire terminals, attaching a thin member carrying electrical elements and contacts to the deformed end portions of each group of terminals, subsequently in timed sequence positioning each thin member against protrusions in a mold cavity of the premolded shell so that the interpositioned thin member is spaced from the inner surfaces of the cavity, introducing additional resin material in fluidized form under transfer molding pressure substantially entirely into the mold cavity and around the members, heating the premolded shell and the fluidized resin material at a temperature substantially above room temperature and under pressure to integrate the introduced resin material and the premolded shell into an isotropic incapsulating material and finally removing the completed incapsulated unit from the molding and the tape.

4. The method of manufacturing an incapsulated electrical unit which comprises mounting groups of wire terminals on a continuous adhesive tape, each group being attached at predetermined longitudinal spacing from adjacent groups, placing a premolded shell of phenolic resin material on each group of terminals to form a wire loom, positioning said shell on said terminals at a point removed from the terminal ends by more than the height of the shell, thereafter deforming end portions of the wire terminals, attaching a thin member carrying electrical elements and contacts to the deformed end portions of each group of terminals, subsequently in timed sequence positioning each thin member and its terminal ends in a mold cavity of its premolded shell, introducing epoxy resin material in fluidized form under transfer molding pressure substantially entirely into the mold cavity heating the premolded shell and the fluidized epoxy resin material at a temperature to integrate the introduced epoxy resin material and the premolded phenolic shell into an isotropic incapsulating material and finally removing the completed incapsulated unit from the molding and the tape.

5. In the method of assembling incased electrical components each with a plurality of electrical elements on a thin base, the steps of attaching sets of wires at predetermined spacing to an adhesive tape to serve as terminals, maintaining the sets of wire terminals at predetermined longitudinal spacing from other sets of terminals on a continuous tape to form a wire loom, in timed sequence delivering thin bases to the terminals and attaching a thin base to the ends of each set of terminals, subsequently bringing successive premolded pieces together to surround in timed sequence the thin bases, forming a mold cavity between the pieces containing the respective thin base, introducing additional thermoset material substantially entirely into the cavities, setting and curing the added thermoset material to integrate the introduced resin material and the premolded shell into an isotropic incapsulating material, subsequently removing the incapsulated unit from the molding and the tape.

6. The method of manufacturing incapsulated electrical units which comprises mounting groups of wire terminals on a continuous adhesive tape, each group being attached at predetermined longitudinal spacing from adjacent groups, placing a unitary premolded shell of resin material on a plurality of groups of terminals to form a wire loom, attaching a thin member carrying electrical elements and contacts to each group of terminals, subsequently in timed sequence positioning a plurality of thin members and respective terminal ends in mold cavities within said unitary premolded shell, introducing additional resin material in fluidized form under transfer molding pressure substantially entirely into the mold cavities, heating the premolded shell and the fluidized resin material at a temperature to integrate the introduced resin material and the premolded shell into an isotropic incapsulating material, subsequently removing the completed incapsulated unit from the molding and the tape, and finally severing the isotropic incapsulating material at predetermined areas between the individual wafers.

7. The method of manufacturing incapsulated electrical units which comprises mounting groups of wire terminals on a continuous adhesive tape, each group being attached at predetermined longitudinal spacing from adjacent groups, placing a unitary premolded shell of resin material on a plurality of groups of terminals to form a wire loom, attaching a thin ceramic member carrying electrical elements and contacts to each group of terminals, subsequently in timed sequence positioning a plurality of thin ceramic members and respective terminal ends in mold cavities within said unitary premolded shell, introducing additional resin material in fluidized form under transfer molding pressure substantially entirely into the mold cavities, heating the premolded shell and the fluidized resin material at a temperature to integrate the introduced resin material and the premolded shell into an isotropic incapsulating material, subsequently removing the completed incapsulated unit from the molding and the tape, and finally severing the isotropic incapsulating material at predetermined areas between the individual wafers.

8. In the method of assembling incased electrical components each with a plurality of electrical elements on a ceramic base, the steps of attaching sets of wires at predetermined spacing to an adhesive tape to serve as terminals, maintaining the sets of wire terminals at predetermined longitudinal spacing from other sets of terminals on a continuous tape to form a wire loom, subsequently in timed sequence delivering ceramic wafers to the terminals and attaching the electrical elements of a single wafer to the ends of the terminals of each set, bringing two premolded pieces together to surround a plurality of said wafers and containing each wafer in a mold cavity, introducing additional thermoset material substantially entirely into the cavities, setting and curing the added thermoset material to integrate the introduced material and the premolded pieces into an isotropic incapsulating material, subsequently removing the completed incapsulated unit from the molding and the tape and finally severing the isotropic thermoset resin at predetermined areas between the individual wafers.

References Cited

UNITED STATES PATENTS

| | | | |
|---|---|---|---|
| 3,251,918 | 5/1966 | Seney | 264—272 X |
| 3,266,463 | 12/1965 | Wallace | 264—272 |
| 3,084,391 | 4/1963 | Parstorfer | 264—272 X |
| 2,887,558 | 5/1959 | Tally | 29—155.69 X |
| 2,766,510 | 10/1956 | Heibel. | |
| 2,698,372 | 10/1954 | Patla | 29—155.69 X |

JOHN F. CAMPBELL, *Primary Examiner.*

J. CLINE, *Assistant Examiner.*

UNITED STATES PATENT OFFICE
CERTIFICATE OF CORRECTION

Patent No. 3,374,536                        March 26, 1968

Walter W. Schroeder et al.

It is certified that error appears in the above identified patent and that said Letters Patent are hereby corrected as shown below:

Column 3, line 24, strike out "lead-wires 10 with respect to each other and with respect" and insert instead -- substrate. The elements 18 are constructed with respect --.

Signed and sealed this 29th day of July 1969.

(SEAL)
Attest:

Edward M. Fletcher, Jr.              WILLIAM E. SCHUYLER, JR.
Attesting Officer                     Commissioner of Patents